Dec. 11, 1951   W. R. WEIGHAM ET AL   2,578,274
MANUFACTURE OF VISCOSE
Filed March 30, 1949
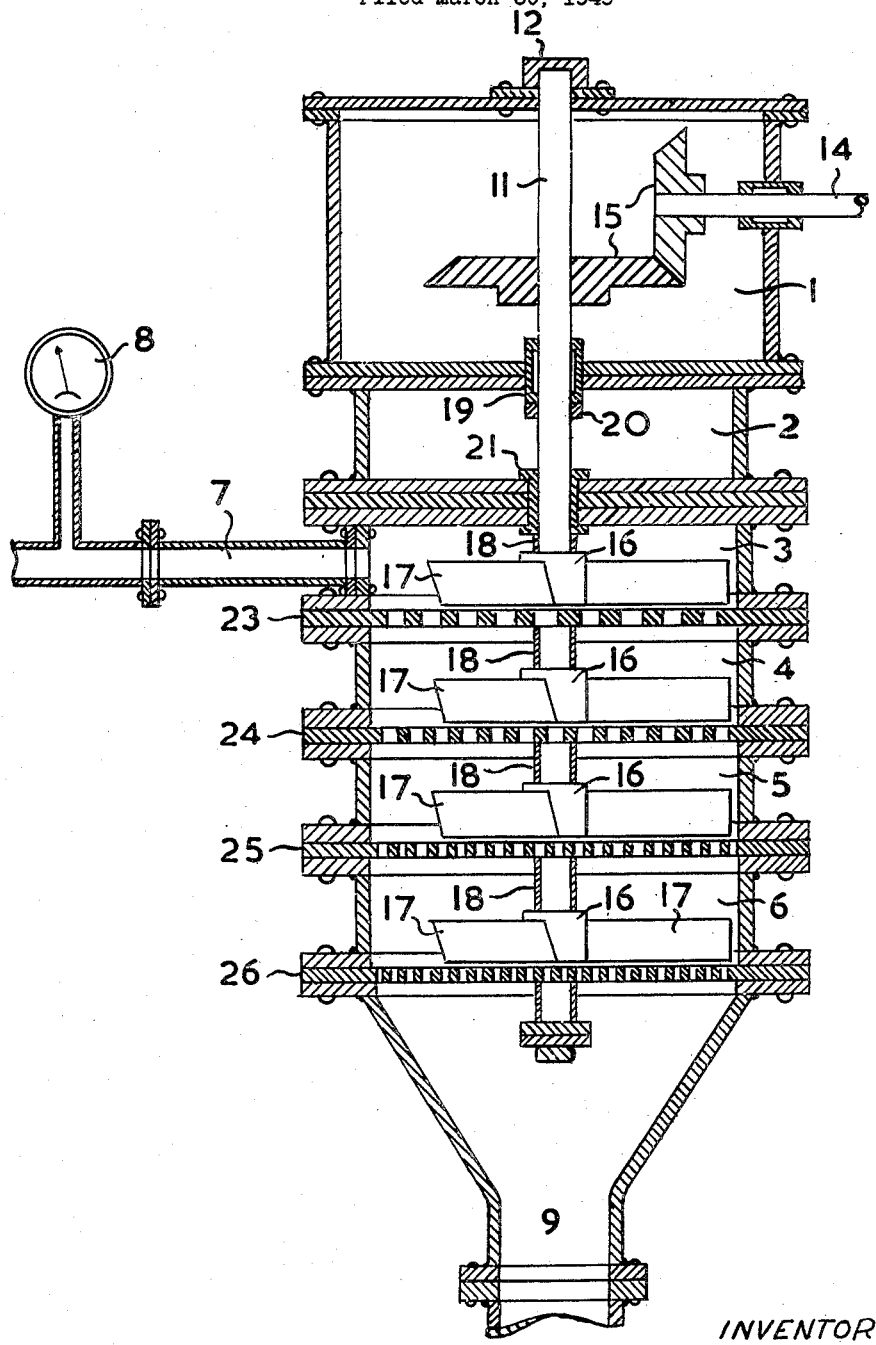
INVENTORS
WILLIAM REGINALD WEIGHAM
WILFRED JOHN CHARLES FIELD
FRANCIS GEORGE DUNTON
BY THEIR ATTORNEYS
Howson and Howson Patented Dec. 11, 1951

2,578,274

UNITED STATES PATENT OFFICE 2,578,274

MANUFACTURE OF VISCOSE

William Reginald Weigham, Coventry, England, Wilfred John Charles Field, Holywell, Wales, and Francis George Dunton, Coventry, England, assignors to Courtaulds Limited, London, England, a British company Application March 30, 1949, Serial No. 84,402
In Great Britain April 5, 1948

2 Claims. (Cl. 241—21)

This invention relates to the manufacture of viscose.

One step in the manufacture of viscose consists in dissolving cellulose xanthate in aqueous caustic soda solution. The solution obtained is very viscous and there is a tendency for cellulose xanthate particles to remain undissolved and so form lumps in the viscose. It is therefore customary to pass the cellulose xanthate-caustic soda mixture through a granulator, disintegrator or an attritor in order to reduce the size of the lumps.

One type of granulator which has been used for making viscose consists of an outer cylindrical shell which is divided into a number of cylindrical compartments, usualy three, each compartment being provided with a perforated base or sieve plate through which the viscose is forced by rotating paddles or blades, the perforations in the bases being successively smaller in each compartment. A granulator of this type for dissolving xanthate is described in United States patent specification No. 1,794,214, the granulator in this case being fully immersed within a mixing bowl so that the xanthate-caustic soda mixture is continuously circulated from the mixing bowl into the cylinder wherein it is sheared by the rotating blades through the fixed perforated bases. In commercial practice it is found that considerable power is required to run the granulator at the desired cutting speed and excessive circulation of the mixture through the granulator is necessary in order to ensure that all cellulose xanthate particles are dissolved.

The object of the present invention is to provide a more efficient method for the production of viscose using a granulator of the type described.

In accordance with the present invention, a method for the production of viscose by feeding a mixture of cellulose xanthate and aqueous caustic soda through a granulator having a number of compartments each provided with a perforated base and rotating blades comprises continuously feeding the mixture to the top of the granulator and continuously withdrawing it from the bottom of the granulator, the rate of feed of the mixture to the granulator and the speed of rotation of the blades being such that the mixture offers substantially no resistance to the rotation of the blades.

The effect of the method of the invention is to overcome the difficulty of lumps of cellulose xanthate being distorted but not disintegrated so that they are forced through the perforations but subsequently resume their original shape and size.

In carrying out the method according to the invention, the granulator is operated below capacity, that is the granulating rate is in excess of the feeding rate and at any particular time, the granulator is comparatively empty. If the mixture is supplied to the granulator at such a rate that the mixture offers substantial resistance to the rotation of the blades, pressure will develop within the granulator with a consequent increase in the power demand and falling off in the degree of disintegration due to lumps of cellulose xanthate being distorted but not disintegrated. The increase in pressure is shown by an increased pressure in the inlet and this will ultimately be detectable for example by a pressure gauge situated in the inlet feed.

It has also been found that in order to obtain the desired disintegration it is necessary to rotate the blades at a sufficient speed to obtain a good cutting action but that this effect must be balanced against the effect of centrifugal force which will apply when the mixture offers resistance to the rotation of the blades and which will rise with an increase in the speed of rotation of the blades until a point is reached when the centre of the perforated base will be dry and the lumps of cellulose xanthate thrown out to the periphery instead of being cut and passed through the base.

In the method according to the invention in order to obtain maximum disintegration, there should be the smallest practicable clearance between the rotating blades and the perforated bases so that the blades exert a cutting action when forcing the xanthate-caustic soda mixture through the perforations in the bases.

The cellulose xanthate-caustic soda slurry before passage through the granulator is preferably partially mixed in a premixer, for example for 30 to 60 minutes, so as to ensure that any excessively large lumps of cellulose xanthate in the mixture are broken up, before the disintegration step. The degree of premixing can be modified, however, to suit the conditions of slurry formation and it is possible to pass the slurry through a cascade of granulators, each of which is run at below capacity. The size of the perforations in the bases of each granulator may be graded so the perforations in each base are successively reduced in size with the result that the size of the xanthate particles passing through each granulator is also successively reduced. The size of the perforations in the bases of the granulator are chosen to suit the type of cellulose xanthate being used in order to avoid any tendency for dry cellulose xanthate lumps to choke the bases.

After the cellulose xanthate-caustic soda mixture has been passed through the granulator in accordance with the invention, solution may be completed by gently stirring the mixture in secondary mixers, preferably in the form of tanks of high capacity fitted with slowly rotating paddles.

The invention is illustrated by the accompanying drawing which shows, partly in section, a granulator which may be used for the production of viscose.

The granulator shown in the drawing consists of a cylindrical shell divided into four compartments 3, 4, 5 and 6 by bases 23, 24, 25 and 26. The bases are perforated and the diameter of the perforations in each plate successively decrease in size, for example, the perforations in base 23 may be 3/8 inch in diameter, the perforations in base 24 $\tfrac{1}{16}$ inch in diameter, the perforations in base 25 1/4 inch in diameter and the perforations in base 26 $\tfrac{1}{16}$ inch in diameter. The compartment 3 has an inlet pipe 7 provided with a pressure gauge 8 of known design. An outlet pipe 9 is provided at the bottom of compartment 6.

A power driven shaft 11 extends axially through the granulator and rotates in bearings 12 and 19 situated at the top and the bottom of the chamber 1. The shaft 11 is driven by a shaft 14 through bevel gears 15 housed in chamber 1. The shaft 14 is driven by a suitable means (not shown). In each of the compartments 3, 4, 5 and 6 a collar 16 is fixed to the shaft 11. Each collar 16 carries three rectangular blades 17. The blades 17 are fixed so that they extend radially from the collar 16 at an angle of 120° to each other and are tilted slightly away from the vertical, all in the same direction, such that on rotation of the shaft 11 the top edges of the blades 17 lead the bottom edges. Each collar 16, is fixed on shaft 11 so that there is a minimum distance between the lower edges of the blades and the upper surfaces of the bases 23, 24, 25 and 26. The exposed portions of the shaft 11 in compartments 3, 4, 5 and 6 are enclosed within cylindrical shields 18.

Chambers 1 and 2 are enclosed except for bearing 19 and an oil seal 20 in the base of chamber 1 and a gland 21 in the base of chamber 2, to allow the passage of the shaft 11.

If the pressure of the mixture of cellulose xanthate and aqueous caustic soda in compartment 3 increases to such a degree that it is forced through the gland 21, it will collect in chamber 2 out of contact with the gearing 15 housed in chamber 1. Oil from the gearing 15 that may pass the oil seal 20 is trapped in chamber 2.

When using the granulator in accordance with the present invention a mixture of cellulose xanthate and aqueous caustic soda is fed through inlet pipe 7 into the compartment 3 and is forced through the perforations in the base 23 by the cutting action of the blades 17. The mixture entering compartment 4 is forced through the perforations in the base 24 into compartment 5 and then through the perforations in base 25 to compartment 6. After passing through the perforations in the base 26 the mixture leaves the granulator by the outlet pipe 9. The mixture of cellulose xanthate and aqueous caustic soda is fed into the inlet pipe 7 at such a rate that the mixture offers substantially no resistance to the rotation of the blades 17 so that no pressure is recorded on the pressure gauge 8. A high degree of disintegration is obtained.

The use of the granulator in accordance with the present invention permits a considerable saving in power. A further advantage is that the machine when operated below capacity in accordance with the invention is self-cleaning; thus, if the machine is stopped for short periods as with a temporary breakdown and solid matter is left on the perforated bases as a result of filtration of the mixture within the granulator, this solid matter is readily taken through with the fresh mixture when the machine is restarted and operated under the defined conditions.

According to one specific example of the use of a granulator similar to that described above but having three collars only each with four blades, the granulator used had a cylindrical shell of internal diameter 20 inches, divided into three compartments by three grids the perforations in the top grid being 3/8 inch in diameter, in the middle grid $\tfrac{1}{16}$ inch diameter and in the bottom grid 3/16 inch diameter. The central shaft carrying the three sets of blades was rotated at 335 revolutions per minute and each set of blades was arranged with a minimum clearance for example of the order of 10 to 15 thousandths of an inch above its associated grid.

The cellulose xanthate and the caustic soda were mixed in the usual way in a premixing tank the proportions being chosen to give a viscose containing 8.0 per cent of cellulose and 6.5 per cent of caustic soda and the slurry was stirred in the premixer for 60 minutes. The slurry so obtained was then fed to the granulator at such a rate that 38,000 lbs. of the mixture were passed through in every hour. During the passage of the slurry, no pressure was recorded on a pressure gauge in the inlet feed. The mixture was passed from the granulator to a secondary paddle tank mixer where it was slowly stirred to complete solution. During the run the power input to the granulator was 5 kilowatts, whereas when the mixture is fed in at a rate at which the blades offer marked resistance to the passage of the mixture, as shown by the inlet pressure gauge, the power input is about 11 kilowatts, and under such conditions the degree of disintegration is reduced.

It will be noted that according to applicants' method the liquid is separated from the oversize lumps by putting the liquid through the granulator at a rate not exceeding the liquid capacity of the perforated bases and below that which will maintain a head of liquid on the perforated bases, rather than running the granulator at maximum liquid capacity by building up heads of liquid on the bases.

What we claim is:

1. A method of producing viscose consisting of the combination of the steps of mixing cellulose xanthate and aqueous caustic soda to cause the cellulose xanthate to swell, the step of cutting the cellulose xanthate lumps by pouring the mixture onto a perforated base at a rate not exceeding the liquid capacity of the perforations and below that which will maintain a head of liquid on the perforated base to separate the liquid from the lumps larger than the perforations and leave such lumps on the base, passing cutting blades over the perforations thereby cutting the lumps to smaller size so that they can pass through the perforations, repeating this separation and cutting at one or more additional perforated bases having progressively smaller perforations, and the step of thereafter collecting the cut lumps and liquid in another container and gently agitating the mixture in order to complete the solution of the lumps.

2. A mehod of producing viscose according to claim 1 in which the pressure on the lumps from above and below each base is maintained equal and the mixture is put through the perforated bases only once.

WILLIAM REGINALD WEIGHAM.
WILFRED JOHN CHARLES FIELD.
FRANCIS GEORGE DUNTON.

REFERENCES CITED

The following references are of record in the file of this patent:

UNITED STATES PATENTS

| Number | Name | Date |
|---|---|---|
| 241,653 | Harrison | May 17, 1881 |
| 1,794,214 | Thurm et al. | Feb. 24, 1931 |

FOREIGN PATENTS

| Number | Country | Date |
|---|---|---|
| 592,105 | Germany | Feb. 1, 1934 |